US009538285B2

(12) United States Patent
Rayala et al.

(10) Patent No.: US 9,538,285 B2
(45) Date of Patent: Jan. 3, 2017

(54) REAL-TIME MICROPHONE ARRAY WITH ROBUST BEAMFORMER AND POSTFILTER FOR SPEECH ENHANCEMENT AND METHOD OF OPERATION THEREOF

(75) Inventors: Jitendra D. Rayala, Sunnyvale, CA (US); Krishna Vemireddy, San Jose, CA (US)

(73) Assignee: VERISILICON HOLDINGS CO., LTD., Plano, TX (US)

( * ) Notice: Subject to any disclaimer, the term of this patent is extended or adjusted under 35 U.S.C. 154(b) by 1129 days.

(21) Appl. No.: 13/531,211

(22) Filed: Jun. 22, 2012

(65) Prior Publication Data

US 2013/0343571 A1 Dec. 26, 2013

(51) Int. Cl.
*G06F 17/00* (2006.01)
*H04R 3/00* (2006.01)
*H04R 29/00* (2006.01)

(52) U.S. Cl.
CPC ............. *H04R 3/005* (2013.01); *H04R 29/006* (2013.01); *H04R 2460/01* (2013.01)

(58) Field of Classification Search
CPC .... H04R 3/005; H04R 2460/01; H04R 29/006
See application file for complete search history.

(56) References Cited

U.S. PATENT DOCUMENTS

2006/0116874 A1* 6/2006 Samuelsson ............ G10L 19/26 704/228
2009/0067642 A1* 3/2009 Buck ...................... H04R 3/005 381/94.1
2010/0246844 A1* 9/2010 Wolff et al. ...................... 381/66
2011/0231185 A1* 9/2011 Kleffner et al. .............. 704/226
2011/0307251 A1* 12/2011 Tashev et al. ................ 704/231
2013/0273871 A1* 10/2013 Kravets ................ H04B 1/1036 455/307
2013/0287069 A1* 10/2013 Su ........................ H04B 7/0617 375/219
2013/0335270 A1* 12/2013 Edelmann ................ H01Q 3/34 342/372

OTHER PUBLICATIONS

Amerineni Rajesh, "Multi Channel Sub Band Wiener Beamformer", Oct. 2012, Thesis for the Degree of Master of Science, Blekinge Institute of Technology.*
Benesty, Jacob, et al., Microphone Array Signal Processing, Berlin: Springer Verlag, 2008, entire book.
Brandstein, Michael, et al. Microphone Arrays: Signal Processing Techniques and Applications, Berlin: Springer Verlag, 2001, entire book.
Tashev, Ivan J., Sound Capture and Processing: Practical Approaches, Chichester: John Wiley, 2009, entire book.
Loizou, Philipos C, Speech Enhancement: Theory and Practice, Boca Raton: CRC Press, 2007, entire book.

* cited by examiner

*Primary Examiner* — Fan Tsang
*Assistant Examiner* — Eugene Zhao

(57) ABSTRACT

A microphone array processing system and method carried out in the system. In one embodiment, the system includes: (1) a beamformer configured to perform adaptive beamforming on gain-compensated signals received from a plurality of microphones, the adaptive beamforming including dynamic range compression and diagonal loading of a sample correlation matrix based on order statistics and (2) a postfilter configured to receive an output of the beamformer and reduce noise components remaining from the beamforming.

22 Claims, 4 Drawing Sheets

REAL-TIME MICROPHONE ARRAY WITH ROBUST BEAMFORMER AND POSTFILTER FOR SPEECH ENHANCEMENT AND METHOD OF OPERATION THEREOF

TECHNICAL FIELD

This application is directed, in general, to sound processing and, more specifically, to a microphone array having a robust beamformer and postfilter.

BACKGROUND

Microphone array processing has become an important subject with the advent of low power, high performance mobile devices, such as Bluetooth wireless headsets, in-car speakerphones, smartphones, tablet computers and small-office/home office (SOHO) video conferencing systems through Smart TV initiatives. Some of these devices provide consumers with a rich voice communication experience by combining (through a suitable technique) spatial signals obtained from an array of microphones placed in certain geometric configuration to reduce any ambient noise or interference present and enhance speech quality.

The process of combining the spatial signals is often referred to as "beamforming." With a knowledge of the microphone geometry, the signals obtained from the array of microphones are combined such that speech coming from a desired direction is preserved, and noise or interference coming from other directions is attenuated.

SUMMARY

One aspect provides a microphone array processing system and method carried out in the system. In one embodiment, the system includes: (1) a beamformer configured to perform adaptive beamforming on gain-compensated signals received from a plurality of microphones, the adaptive beamforming including dynamic range compression and diagonal loading of a sample correlation matrix based on order statistics and (2) a postfilter configured to receive an output of the beamformer and reduce noise components remaining from the beamforming.

In another embodiment, the system includes: (1) a beamformer configured to perform beamforming on gain-compensated signals received from a plurality of microphones and generate an index indicating a noise reduction performance of the beamformer and (2) a postfilter configured to receive an output of the beamformer and employ a log likelihood tracking technique, weighted by the index, to estimate noise remaining from the beamforming.

In yet another embodiment, the system includes: (1) a beamformer configured to perform adaptive beamforming on gain-compensated signals received from a plurality of microphones and transformed into a frequency domain and generate an index indicating a noise reduction performance of the beamformer, the adaptive beamforming including dynamic range compression and diagonal loading of a sample correlation matrix based on order statistics and (2) a postfilter configured to receive an output of the beamformer and employ a log likelihood tracking technique, weighted by the index, to estimate noise remaining from the beamforming.

BRIEF DESCRIPTION

Reference is now made to the following descriptions taken in conjunction with the accompanying drawings, in which.

DETAILED DESCRIPTION

Figure 1:
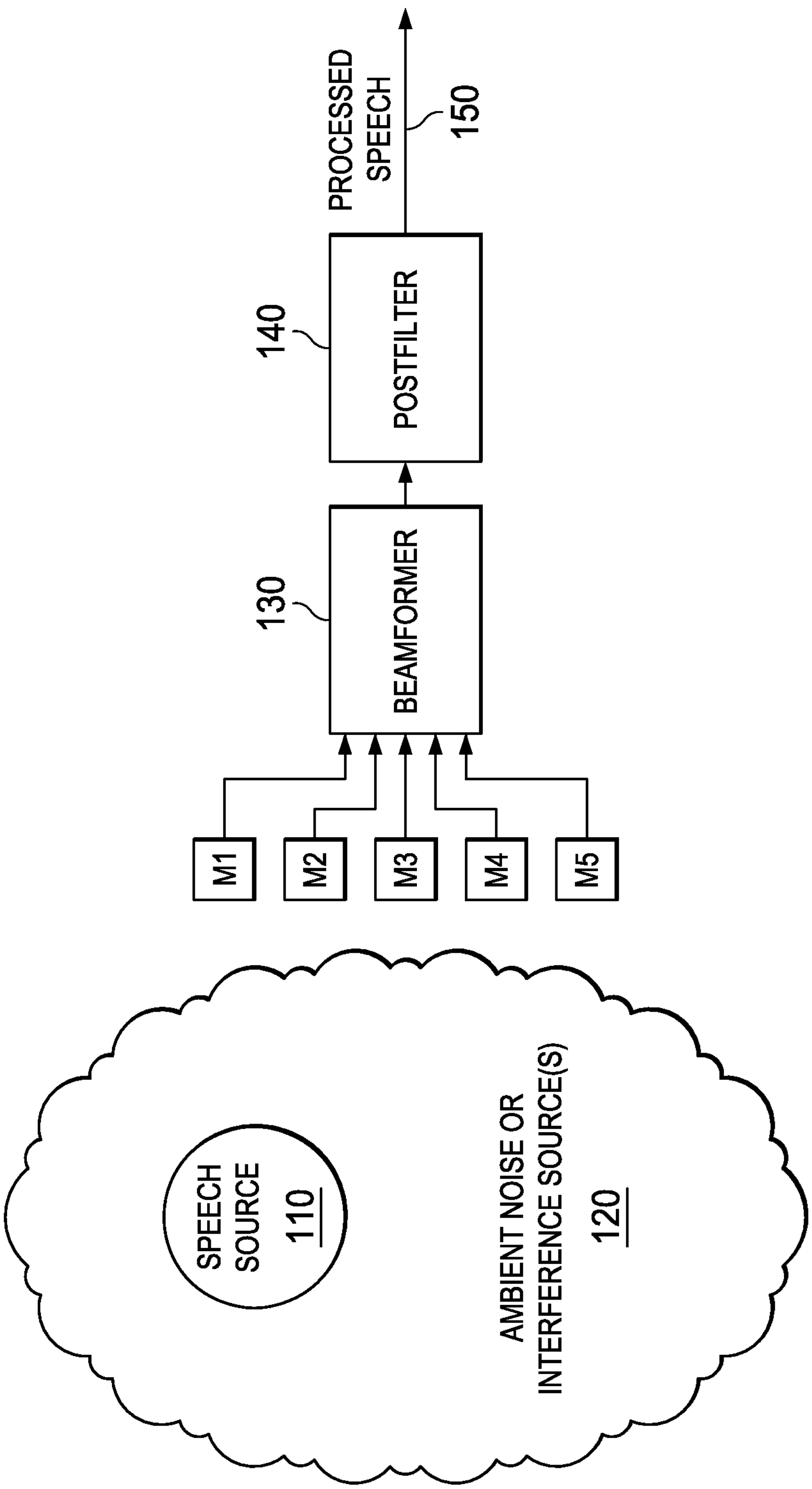
FIG. 1 is a block diagram of one embodiment of a microphone array processing system.

As stated above, beamforming is a process of combining signals obtained from an array of microphones such that speech coming from a desired direction is preserved and noise or interference coming from other directions is attenuated. Beamforming is carried out with at least some knowledge of the geometric configuration in which the microphones are placed, which depends on the target application in which the microphones are operating.

Beamforming in the context of antenna array processing for radar and wireless communication systems has been well studied and successfully used for many years. However, the speech signal characteristics and the environment in which microphone arrays are used make microphone array beamforming substantially more complex and challenging. For this reason, antenna beamforming techniques have not worked well for speech processing.

Nonetheless, some progress has been achieved over the years, and various theoretical (and sometimes impractical) techniques have been reported in books and technical papers (see, e.g., Benesty, et al., *Microphone Array Signal Processing*, Berlin: Springer Verlag, 2008; Brandstein, et al., *Microphone Arrays: Signal Processing Techniques and Applications*, Berlin: Springer Verlag, 2001; and Tashev, *Sound Capture and Processing: Practical Approaches*, Chichester: John Wiley, 2009). In this context, it has become apparent that beamforming alone is often not able to provide adequate noise reduction performance. Hence, beamforming is often augmented with postfiltering to reduce noise components remaining from the beamforming. Various single or multiple channel postfilter techniques have been proposed in literature (see, e.g., Brandstein, et al., supra; Tashev, supra; and Loizou, *Speech Enhancement: Theory and Practice*, Boca Raton: CRC Press, 2007). However, these conventional beamforming and postfiltering techniques have proven difficult or disadvantageous to implement in the target applications described above.

It is realized herein that microphone array processing particularly in the context of the target applications and devices mentioned in the Background above involve several practical design constraints, including: algorithmic delay, input dynamic range and robust and low-power operation.

A. Algorithmic Delay

In voice communication applications, algorithmic delay plays an important role as the cumulative delay from buffering, algorithms and network transport can significantly degrade overall voice quality. Practical microphone array processing embodiments therefore should introduce at most a relatively small delay. To this end, specific embodiments disclosed herein are capable of exhibiting an algorithmic delay of less than 5 ms.

B. Input Dynamic Range

In speakerphone applications, it is advantageous, though not necessary, that the beamformer work in tandem with an acoustic echo canceller (AEC). An example AEC has a wide input range spanning −0 dBm to −30 dBm with a 14-bit pulse code modulation (PCM) input. Also, the variation of the level within a speech signal can be quite significant (of the order of 15-20 dB). Specific embodiments disclosed herein are capable of supporting a wide input dynamic range.

C. Robust Operation

In microphone array applications, mismatch in microphone gain or sensitivity, reverberation and uncertainty in the geometry of the array (defined herein as the distances between the microphones in the array and the orientation of the source with respect to the array) can play an important role. Specific embodiments disclosed herein are capable of working with certain amount of gain mismatch, reverberation and uncertainty in geometry and therefore of providing robust operation. For purposes of this disclosure, a circuit or technique is said to be "robust" when it is useful across a relatively wide variety of target applications and acoustic environments.

D. Low Power Operation

Power consumption is another important factor to consider in the above applications, particularly in headsets, smartphones and tablet computers. Since speech processing is computationally intensive, it would be advantageous to be designed to run on an embedded digital signal processor (DSP), particularly a fixed-point, low power, embedded, programmable DSP. Much of the power consumption of an embedded DSP depends on: (a) the speed at which the system clock driving the DSP is running and (b) the overall amount of memory the DSP uses for storing the program, data and any tables. Often, these are tightly bounded.

The nature of the fixed-point arithmetic of the embedded processor and the tight resource requirement recommend microphone array processing techniques that are somewhat insensitive to the fixed-point arithmetic and stay within the resource consumption target. A suitable goal is therefore to arrive at a solution that can satisfy the above constraints and provide suitable noise reduction performance while preserving speech quality. Specific embodiments disclosed herein are capable of providing noise reduction performance of about 15-30 dB, using a dual microphone array and depending upon the acoustic environment.

FIG. 1 is a block diagram of one embodiment of a speech processing system and serves to illustrate an environment within which a method of microphone array processing may be carried out. A speech source 110 is surrounded by one or more ambient noise or interference sources 120. A microphone array M1, M2, M3, M4, M5 is located such it captures acoustic signals emanating from the speech source 110, as well as the one or more ambient noise or interference sources 120. It should be noted that, while FIG. 1 shows the microphone array M1, M2, M3, M4, M5 has five microphones arranged generally linearly with respect to one another, other embodiments of the speech processing system have other numbers of microphones (i.e., two or more) arranged other than linearly. The microphone array processing method embodiments described herein generally apply to arrays having various numbers of microphones arranged in various geometries with respect to one another.

A beamformer 130 is coupled to the microphone array M1, M2, M3, M4, M5 and is configured to combine signals obtained from the microphone array M1, M2, M3, M4, M5 in such a way that speech coming from the speech source 110 is preserved, and noise or interference from the one or more ambient noise or interference sources 120 is attenuated. A postfilter 140 is coupled to the beamformer 130 and configured to act on the output of the beamformer 130 to reduce any remaining noise components. The result is processed speech 150.

In the illustrated embodiment, the beamformer 130 and postfilter 140 are embodied as one or more sequences of instructions executable in a DSP or a general purpose processor, such as a microprocessor, to carry out the functions they perform. However, those skilled in the pertinent art should understand that certain embodiments of the beamformer 130 and postfilter 140 are embodied in analog or digital hardware and fall within the broad scope of the invention.

Figure 2:
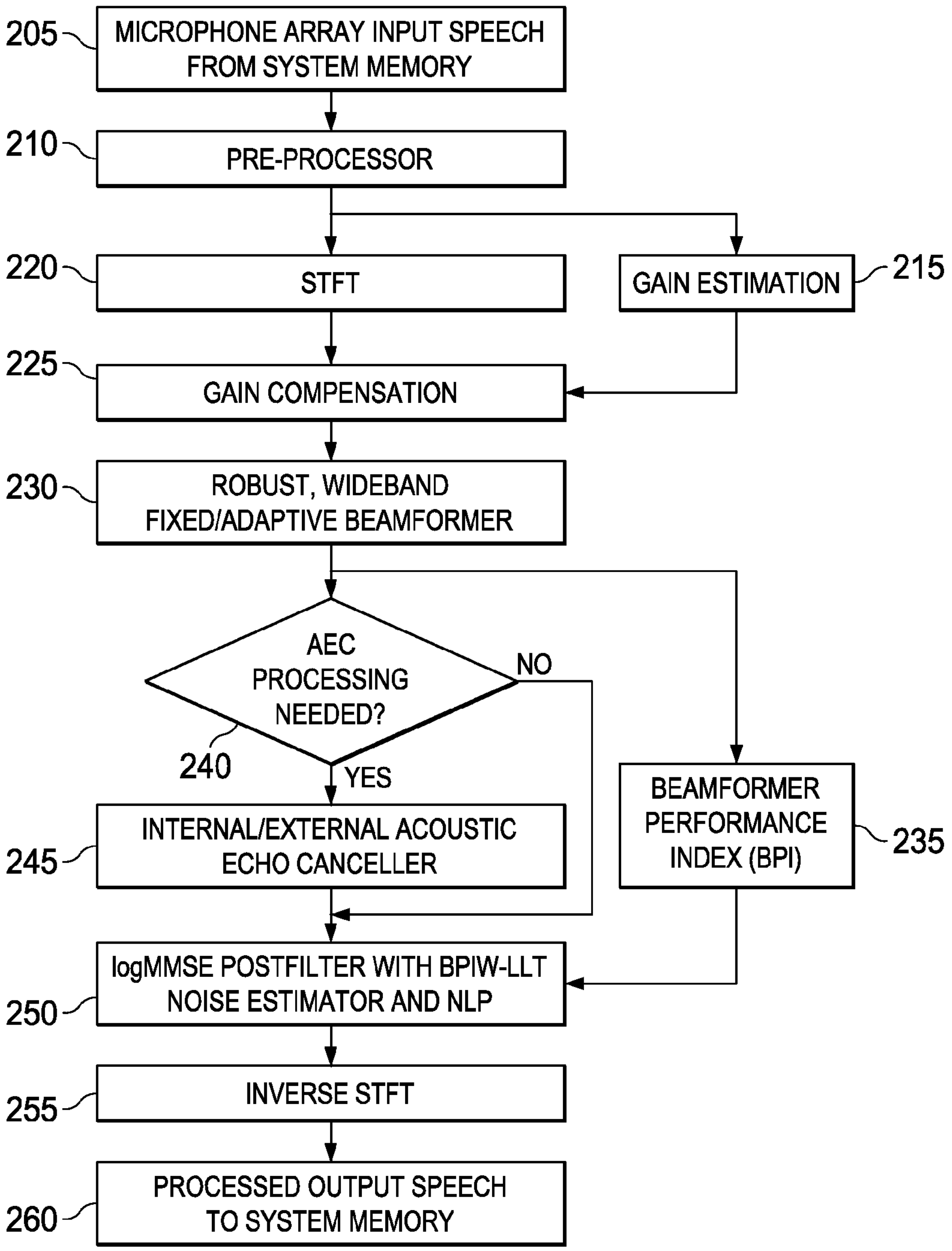
FIG. 2 is a high-level flow diagram of one embodiment of a method of microphone array processing carried out in the microphone array processing system of FIG. 1.

FIG. 2 is a high-level flow diagram of one embodiment of a method of microphone array processing. According to FIG. 1, signals from a microphone array are obtained (e.g., from system memory) in a step 205. Pre-processing (e.g., high-pass filtering) is performed on the signals in a step 210. An estimated gain to be applied to the signals is determined in a step 215. A short-term Fourier transform (STFT) is performed on the signals in a step 220 to transform them from the time domain to the frequency domain. The gain determined in the step 215 is then applied to the transformed signals in a step 225. A beamformer then operates on the transformed signals in a step 230. In one embodiment, the beamformer is fixed. In an alternative embodiment, the beamformer is adaptive. In a step 235, a beamformer performance index (BPI) is calculated. In a step 240, it is determined whether or not the signals will benefit from AEC processing. If so, AEC processing is carried out in a step 245.

Whether or not AEC processing is carried out in the step 245, a postfilter is applied to the signals in a step 250. In the illustrated embodiment, the postfilter is a log-spectral minimum mean squared error (log-MMSE) postfilter with a BPI weighted log likelihood tracking (BPIW-LLT) noise estimator. In a more specific embodiment, the postfilter is further configured to perform nonlinear processing (NLP).

At this point, an STFT is again applied to transform the signals from the frequency domain back to the time domain in a step 255. The processed speech is provided (e.g., to system memory) for further use in a step 260.

In FIG. 2, microphone array processing can be broadly broken down into four stages: (a) microphone input processing, (b) beamforming, (c) postfiltering and (d) output processing. Before beginning a more detailed description of these four general stages in greater detail, some of the parameters that will be employed in the description will first be defined.

M—Number of microphones d—Distance between the microphones c—Velocity of sound 342 m/sec f—Frame index T—Frame duration (4 ms in the illustrated embodiments)

$F_s$—Sampling frequency

N—Frame length in samples=$\lfloor TF_s \rfloor$

K—Number of STFT bins to process=N+1

α—Short-term smoothing filter coefficient ($2^{-5}$ in the illustrated embodiments)

β—Long-term smoothing filter coefficient ($2^{-9}$ in the illustrated embodiments)

I. Microphone Input Processing

If s(t) is the desired source signal, $\theta_s$ is the desired source look direction and $\alpha_i(\theta_s,t)$ is the acoustic impulse response from desired source to the $i^{th}$ microphone, the signals received at each microphone (under a far-field assumption) may be written as:

$$m_i(t)=g_i(s(t)*\alpha_i(\theta_s,t)+r_i(t))+v_i(t)\ 0\le i\le M-1, \quad (1)$$

where $m_i(t)$, $g_i$, $r_i(t)$ and $v_i(t)$ are the received microphone signal, the gain, the ambient noise or interference in the acoustic environment and the uncorrelated white Gaussian system noise at the $i^{th}$ microphone, and * represents a matrix convolution operation. For an end-fire array $\theta_s=0°$; for a broad-side array $\theta s=90°$. For the sake of simplicity, the representation of Equation (1) assumes that the microphones are omnidirectional. The microphone array processing methods described herein also work with directional microphones.

A. Acquisition

The first step in microphone input processing is acquisition of the microphone signals. In the illustrated embodiment, the microphone signals are acquired using analog-to-digital converters and sampled with the desired sampling rate $F_s$. The sampled microphone signals can then be written as:

$$x_i[n]=g_i(s[n]*a_i[\theta,n]+r[n])+v_i[n]\ 0\le i\le M-1 \quad (2)$$

An objective of the illustrated embodiments is to enhance the desired speech s[n] by canceling the ambient and uncorrelated noise components and reduce reverberation. After the signals are sampled, they are buffered (e.g., in system memory) for further processing. As mentioned above, algorithmic delay factors into how the microphone signals are processed and data memory is consumed. It is realized herein that, to achieve an algorithmic delay less than 5 ms, speech can advantageously be processed in frames having a duration of 4 ms. It will be demonstrated below how this choice of frame duration results in an algorithmic delay of about 4 ms. Other embodiments have different delay and frame length parameters. In fact, embodiments having shorter frame durations will be described and analyzed below.

B. Pre-Processor

The first stage in the microphone array processing method embodiment described herein involves a pre-processor. The illustrated embodiment of the pre-processor includes a programmable high-pass filter (HPF) useful in reducing the impact of low-frequency ambient noise on the overall performance and eliminate any DC bias present in the signal. The filter low-frequency cutoff is typically selected anywhere between 120 Hz to 200 Hz. In the illustrated embodiment, the same pre-processor is used on all the microphone channels to avoid introducing inter-channel gain or phase mismatches.

C. Gain Estimation

As mentioned earlier, gain mismatch can have significant effect on the beamformer performance. Hence pre-calibration or self-calibration may be needed to compensate for this mismatch. Pre-calibration is not only a relatively expensive operation but also does not account for changes in microphone characteristics due to ageing. Accordingly, the illustrated embodiment employs self-calibration. To ensure that no substantial additional algorithmic delay is introduced during self-calibration (and to track any variations over time due to factors such as reverberation), self-calibration is performed and compensated for in every frame in the illustrated embodiment.

Conventional self-calibration techniques for gain mismatch estimation and compensation are known and will not be described in detail herein. Some techniques calculate the gain to apply to each microphone as the ratio of average input power across all microphones to the average input power of each microphone. However, such techniques are disadvantageous when estimating and compensating occurs within a frame, because a considerable gain mismatch may cause a loss in the desired speech at the beamformer output. Other techniques employ adaptive filters to self-calibrate the gains and compensate. However, such techniques are constrained to perform the self-calibration only in the beginning and not during normal operation of the beamformer since the adaptive filters they employ are computationally intensive. Were such techniques to be employed in the microphone array processing embodiments disclosed herein, variations over time, e.g., due to reverberation, could not be tracked over time, since self-calibration is performed once initially.

Disclosed herein is an alternative, novel technique for estimating and compensating for gain mismatches in every frame. According to the technique, one of the microphones is designated as a reference microphone. All other microphones are then brought to the level of the reference microphone. In one embodiment, the microphone closest to the speech source is used as the reference microphone. With this novel technique, only the relative gain between the reference and the other microphones needs to be estimated. Assuming that the signal-to-noise ratio (SNR) is relatively high, the contribution of uncorrelated system noise to the microphone input power can be safely disregarded. Since the microphones are close to each other, it can be further assumed that the power from the desired source and ambient noise is the same at each microphone under far-field conditions. These conditions are satisfied in the target applications considered above, hence the relative gains are estimated herein using the power in the microphone signals over each frame, as Equation (3) shows:

$$b_i[f]=\frac{g_0[f]}{g_i[f]}=\sqrt{\frac{P_0[f]}{P_i[f]}}\quad 0\le i\le M-1, \quad (3)$$

where $b_i[f]$ is the relative gain between the reference microphone and the $i^{th}$ microphone (the index f referring to the frame being processed, since gain estimation and compensation and subsequent techniques operate on frames) and $P_i[f]$, is calculated as:

$$P_i[f]=\frac{1}{N}\sum_{i=0}^{N-1}(x_i[f,l])^2\quad 0\le i\le M-1. \quad (4)$$

Once the relative gains are computed, the microphone input can be compensated. However, instead of compensating the gain directly in the time domain, the illustrated embodiment calls for the frames to be compensated in the frequency domain to reduce the accumulation of bit errors arising from fixed-point arithmetic. An alternative embodiment compensates the frames in the time domain.

D. STFT

As just described, gain compensation can be carried out in the frequency domain to reduce bit errors. In fact, it is realized herein that further advantages may result by further employing the frequency domain for speech frame processing. For example, it is realized that time-domain beamforming techniques used for antenna array processing are more adaptable for processing microphone array signals when the signals are first transformed into a set of lower bandwidth signals using frequency decomposition. In the illustrated embodiment, a discrete-time STFT (see, e.g., Loizou, supra). A weighted overlap-add (WOLA) technique (see, e.g., Crochiere, "A Weighted Overlap-Add Method of Short-Time Fourier Analysis/Synthesis," IEEE Trans. on Acoustics, Speech and Signal Proc., pp. 99-102, February 1980) may be employed to reduce blocking artifacts. The illustrated embodiment employs a WOLA technique having a 50% overlap and a periodic Hann window given by:

$$h[n]=\sqrt{0.5\left(1-\cos\left(2\pi\frac{n}{2N}\right)\right)}\quad 0\le n\le 2N. \tag{5}$$

Assuming a 50% overlap, a frame of input is processed over two frames, since both halves should be involved in the addition during synthesis. Hence the algorithmic delay of the illustrated embodiment of the microphone array processing method is 4 ms, which satisfies the example delay constraint set forth above. In the illustrated embodiment, the STFT is performed independently on all of the microphone channels. Consequently, 2N complex spectral values are generated for every frame of each microphone channel. For simplicity's sake, these 2N complex spectral values will be referred to hereinafter as "STFT bins." Those skilled in the pertinent art should understand that the STFT spectrum is symmetric since the input microphone signals are real valued. Hence, only K=N+1 number of bins would actually need to be processed.

E. Gain Compensation

If $X_i^u[f,k]$ represents the $k^{th}$ uncompensated STFT bin of the $i^{th}$ microphone channel, the gain-compensated STFT bins are given as:

$$X_i[f,k]=b_i[f]X_i^u[f,k]\quad 0\le i\le M-1\quad 0\le k\le K \tag{6}$$

II. Robust Beamformer

K independent narrowband channels result from frequency decomposition, on which K independent beamformers are applied in the illustrated embodiment. In one specific embodiment, each such beamformer applies suitable weights on the STFT bins of all the microphone channels and performs a summation. If Y[k] is the output of $k^{th}$ beamformer, $$Y[f,k]=w^H[f,k]X[f,k], \tag{7}$$

where w[f,k] is the M-length weight vector and X[f,k] is:

$$X[f,k]=[X_0[f,k],X_1[f,k],\ldots,X_{M-1}[f,k]]^T \tag{8}$$

The illustrated embodiment of the beamformer obtains suitable weight vectors for each of the STFT bins. Broadly speaking, two ways exist for obtaining weight vectors. The first is fixed beamforming in which the weights are pre-computed and remain the same during beamforming. The second is adaptive beamforming in which the weights are estimated in real time as beamforming is carried out. Both fixed and adaptive beamforming will be described herein, as it is realized that the approaches better fit different target applications.

Figure 3:
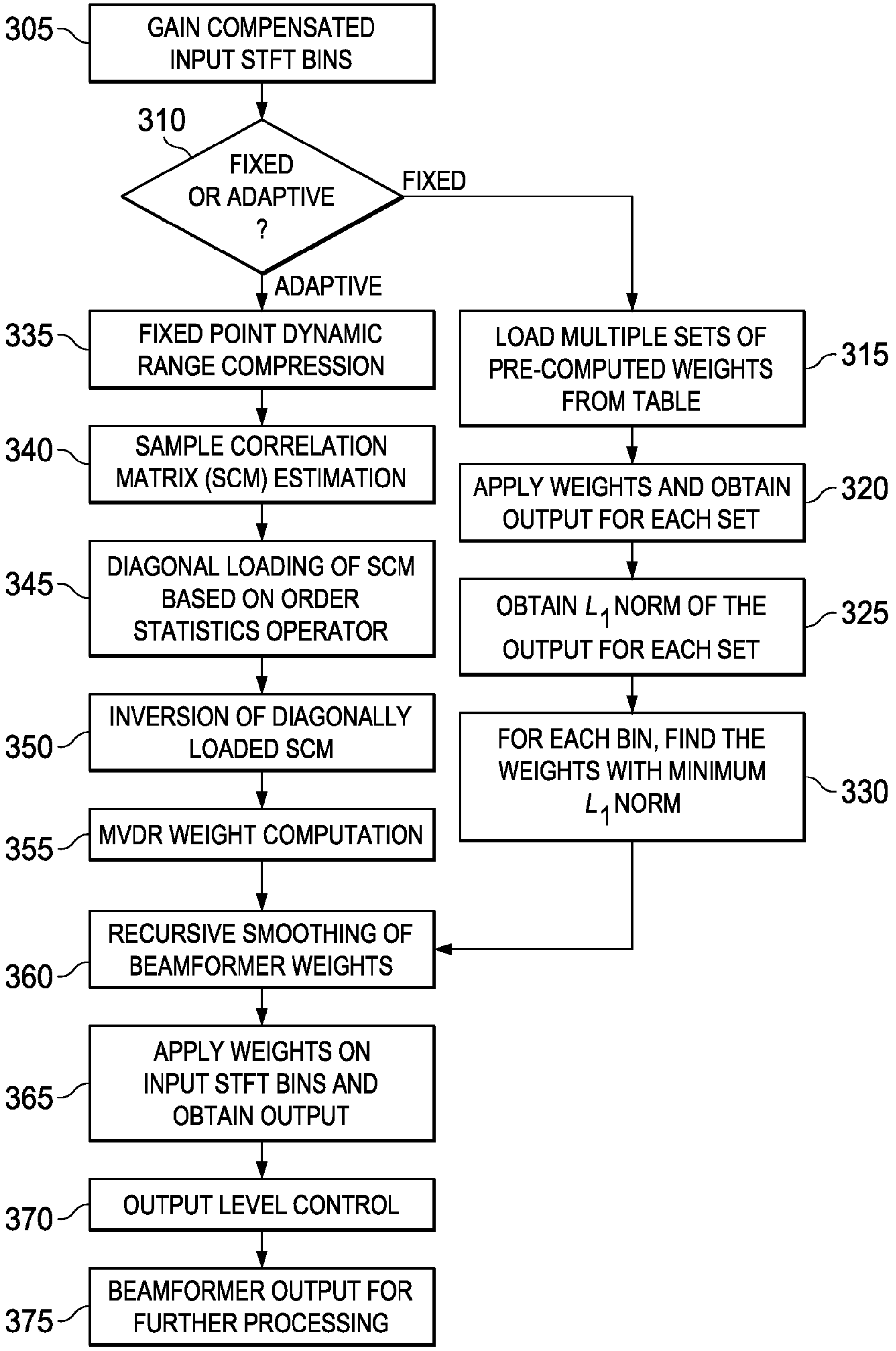
FIG. 3 is a flow diagram of one embodiment of a method of beamforming carried out in the method of FIG. 2.

FIG. 3 is a flow diagram of one embodiment of a method of wideband fixed and adaptive beamforming. FIG. 3 represents further detail regarding the step 230 of FIG. 2. The method begins in a step 305 with the generation of gain-compensated STFT bins. In a decisional step 310, it is determined (e.g., based on the type of application in which the microphone array processing is being carried out or based on environmental parameters) whether fixed or adaptive beamforming should be carried out.

A. Fixed Beamforming

Fixed beamforming takes place if the outcome of the decisional step 310 is to carry out fixed beamforming. Those skilled in the pertinent art are aware of several methods of pre-computing weights for fixed beamformers. Conventional fixed beamformers often compute only one set of weights and apply the weights once at the beginning of beamforming; the weights remain constant throughout. However, it is realized herein that, even though the weights may be pre-computed and not determined in real time from the data, it is nonetheless advantageous to retain some ability to track the changing acoustic environment. Accordingly, one embodiment employs a novel optimal weight selection method.

The general idea behind this method is to pre-compute multiple sets of weights, obtain beamformer output for each set and choose the one with the minimum output $L_1$ norm. Accordingly, multiple sets of pre-computed weights are loaded, e.g., from a table, in a step 315. The weights are applied to the STFT bins, and beamformer outputs corresponding to each set are obtained, in a step 320. The $L_1$ norm is then obtained for each beamformer output in a step 325. Then, the weights corresponding to the minimum $L_1$ norm are identified in a step 330. In the illustrated embodiment, this operation is performed independently on all the STFT bins and with every input frame. Hence, even though the sets of pre-computed weights remain the same, the weights applied on a particular STFT bin may change from frame to frame depending on the spectral content in that bin. If Q represents the number of sets of weights and $W[k]=[w^0[k], w^1[k], \ldots, w^{Q-1}[k]]$ is the set of Q weight vectors for the $k^{th}$ STFT bin, the novel optimal weight selection method can be described as:

$$w[f,k]=\min_{w}|[w^H X[f,k]|\quad w\in W[k]. \tag{9}$$

Once the optimal weights for all the STFT bins are determined, the weights are recursively smoothed in a step 360.

B. Adaptive Beamforming

Adaptive beamforming takes place if the outcome of the decisional step 310 is to carry out adaptive beamforming. Those skilled in the pertinent art are aware of many types of adaptive beamformers. Examples include Linear Constrained Minimum Variance (LCMV) beamformers based on Frost's Algorithm, Generalized Sidelobe Canceller (GSC) beamformers and Minimum Variance Distortionless Response (MVDR) beamformers.

Among the examples set forth above, only the MVDR beamformer is capable of operating without having to estimate acoustic impulse responses $\alpha_i(\theta_s,t)$. The performance of the other adaptive beamformer types degrades considerably absent a knowledge of impulse response. Unfortunately, acoustic impulse response is extremely difficult to estimate, even in stationary applications such as video conferencing. Since many target applications are mobile and experience a rapidly changing acoustic impulse response, this disadvantage is significant. In addition to avoiding the acoustic impulse response issue, MVDR beamformers also provide faster tracking of time-variant acoustic environments and improved array patterns. For this reason, the adaptive beamformer embodiments described herein are based on the MVDR beamformer. While a general discussion of MVDR beamformers is outside the scope of this disclosure, they are generally described in Cox, et al., "Robust Adaptive Beamforming," IEEE Trans. on Acoustics, Speech and Signal Proc., pp. 1365-1376, October 1987, incorporated herein by reference.

Unfortunately, conventional MVDR performance suffers when subjected to reverberation or uncertainty in microphone array geometry. Since MVDR weights are derived from an input correlation matrix, conventional MVDR is also prone to fixed-point arithmetic errors. Accordingly, it is realized herein that what is needed is a novel MVDR-based method that is not only substantially less vulnerable to reverberation, microphone geometry uncertainty and fixed-point arithmetic errors but also less taxing on processing and memory resources. Embodiments illustrated and described herein are directed to novel embodiments of an MVDR beamformer having at least one of these improvements.

In FIG. 3, one embodiment of the novel MVDR-based adaptive beamforming method includes performing a fixed point dynamic range compression in a step 335, estimating a sample correlation matrix (SCM) 340, diagonally loading the SCM based on an order statistics operator in a step 345, inverting the diagonally-loaded SCM in a step 350 and computing an MVDR weight vector in a step 355.

The MVDR weight vector is obtained as a solution to the constrained quadratic optimization problem given as:

$$\min_{w} w^H R_{XX}[f,k]w \quad \text{subject to } d_{\theta i}^H[k]w=1, \tag{10}$$

where $R_{XX}[f,k]$ and $d_{\theta_i}[k]$ are the input cross correlation matrix and the steering vector of the $k^{th}$ bin and are defined by:

$$R_{XX}[f,k]=E[X[f,k]X^H[f,k]], \tag{11}$$

and $$d_{\theta_s}[k]=[1,e^{-j\Omega[k]}, \ldots ,e^{-j(M-1)\Omega[k]}]^T \tag{12}$$

where $\Omega[k]=d\cos(\theta_s)\omega_k/c'$, and $\omega_k$ is the frequency of the $k^{th}$ bin in radians/sec. Using Lagrangian multipliers, the MVDR solution is obtained as:

$$w[f,k]=\frac{R_{XX}^{-1}[f,k]d_{\theta_s}[k]}{d_{\theta_s}^H R_{XX}^{-1}[f,k]d_{\theta_s}[k]}. \tag{13}$$

In the illustrated embodiment, the correlation matrix in Equation (11) is estimated using time-averages. This is usually referred to as an SCM and is given by:

$$R_{XX}[f,k]=(1-\alpha)R_{XX}[f-1,k]+\alpha X[f,k]X^H[f,k]. \tag{14}$$

(1) Dynamic Range Compression: With fixed-point arithmetic, the numerical range of sample correlation matrix becomes twice that of the input STFT bin. For example, if the STFT bins are represented with 32-bit words, the correlation values would need to be represented using 64-bit words. Unfortunately, computing the inverse of such correlation values are difficult and consumptive in terms of memory and demanding in terms of clock speed. Of course, the correlation matrix values could be truncated to 32 bits, however, processing signals with lower power levels would be adversely affected, and a wide input power level range would not be possible (e.g., the full input power level range from 0 dBm to −30 dBm as described above). To accommodate a relatively wide input power level range, the range of the STFT bins is dynamically compressed in the illustrated embodiment so the SCM can be estimated without losing precision.

In the illustrated embodiment, the dynamic range compression method updates the STFT bin levels by first normalizing the STFT bins with their short-term levels and then elevating them to a reference level. By choosing an appropriate reference level, the precision with which the STFT bins are represented can be controlled. The short-term level $S_i^X[f,k]$ of the $k^{th}$ bin of the $i^{th}$ microphone is obtained as:

$$S_i^X[f,k](1-\alpha)S_i^X[f-1,k]+\alpha|X_i[f,k]| \tag{15}$$

To ensure that any relatively fast variations in the STFT bins are captured, fast rise conditions (i.e., those exceeding a threshold) are detected before updating the level. If the input STFT bin rises faster than the threshold, the level is replaced with a fraction of the input and updated as:

$$S_i^X[f-1,k]=\begin{cases} S_i^X[f-1,k] & \text{if } S_i^X[f-1,k]\geq\rho\,|X_i[f,k] \\ \rho\,|X_i[f,k] & \text{if } S_i^X[f-1,k]<\rho|X_i[f,k]|, \end{cases}$$

where ρ is chosen as $2^{-2}$ in the illustrated embodiment. The range compressed STFT bins are then given as:

$$X_i^{\tau}[f,k]=\frac{\Psi}{S_i^X[f,k]}X_i[f,k], \tag{16}$$

where Ψ is the reference level. These range-compressed STFT bins are used in place of the original bins to compute the sample correlation matrix in Equation (14).

2) Diagonal Loading: As mentioned above, reverberation and uncertainties in microphone geometry can adversely affect the sample correlation matrix, which in turn affects the beamformer performance. It is known that an SCM can be made robust by adding a weighted diagonal matrix, a technique known as "diagonal loading." However, conventional diagonal loading techniques employ eigenvalue decomposition of the SCM to arrive at the loading factor. Unfortunately, eigenvalue decomposition is prone to fixed-point arithmetic errors, and its complexity consumes significant processor bandwidth. Hence a novel loading technique is introduced herein that is based on order statistics of the diagonal elements of the SCM. Let $\lambda_0, \lambda_1, \ldots, \lambda_{M-1}$ be the order statistics of the diagonal elements of $R_{XX}[f,k]$. $\lambda_0$, $\lambda_{M-1}$ and $\lambda_R=(\lambda_{M-1}-\lambda_0)$ represent the minimum, maximum and the range of the diagonal elements respectively, which are straightforward to compute and are not affected by fixed-point errors. The loading factor is then defined as:

$$R_d[f,k]=\kappa\lambda_R\left(\frac{\lambda_0[f,k]}{\lambda_{M-1}[f,k]}\right)I. \tag{17}$$

The loading is chosen proportional to the range of the order statistics with the proportionality factor defined by the ratio of minimum to the maximum of the order statistics. The rationale behind this choice is that the dynamic range compression technique described above already reduced the range of the diagonal elements on average. Hence, the loading factor only needs to be adjusted to account for any instantaneous differences in the range. In Equation (17), the parameter κ controls the robustness versus noise reduction ability of the beamformer, and I is an M×M identity matrix. Based on extensive experimental analysis, κ is advantageously between 0.25 and 0.5, which provides good noise reduction performance with low desired signal cancellation. Once computed, the diagonal loading matrix in Equation (17) is added to the SCM obtained with range-compressed STFT bins, and the MVDR weight vector is calculated using Equation (13).

Returning to FIG. 3, having determined either fixed or adaptive beamforming weights, further processing is then performed on the microphone array signals. In a step 360, the beamformer weights are smoothed, e.g., recursively. In a step 365, the weights are applied on the input STFT bins to obtain an output. In a step 370, the level of the output is controlled. The output is then made available for further processing, including postfiltering in a step 375.

C. Recursive Weight Smoothing

One of the consequences of using a smaller frame duration is that beamformer weights may change quite significantly from frame to frame, potentially increasing the loss of speech. To ensure that the beamformer weights do not change excessively from frame to frame, the embodiment of the microphone array processing method illustrated herein employs recursive smoothing. If $w^b[f,k]$ and $w[f,k]$ respectively represent the weights before and after smoothing, $$w[f,k]=(1-\alpha)w[f-1,k]+\alpha w^b[f,k]. \tag{18}$$

D. Beamformer Output Control

The output of the beamformer Y[f,k] is then obtained by using the new weights in Equation (7). As a last step of the illustrated embodiment, the beamformer output is limited to ensure that it is less than or equal to the output of the reference microphone, viz.:

$$Y[f,k]=\begin{cases} Y[f,k] & \text{if } |Y[f,k]|\le|X_r[f,k]| \\ X_r[f,k] & \text{if } |Y[f,k]|>|X_r[f,k]|, \end{cases} \tag{19}$$

where $X_r[f,k]$ is the $k^{th}$ STFT bin of reference microphone. The above enhancements of gain estimation and compensation, fixed-point dynamic range compression, diagonal loading based on order statistics, recursive weight smoothing and output limiter make the beamformer robust.

E. BPI

The illustrated embodiment of the microphone array processing method employs a BPI (in the step 235 of FIG. 2), which indicates the noise reduction performance of the beamformer. In the illustrated embodiment, the BPI is defined as follows:

$$\phi[f,k]=\eta+\frac{S^E[f,k]}{S_r^X[f,k]}, \tag{20}$$

where η is a parameter employed to control the estimated noise magnitude level in the postfilter. $S^E[f,k]$ and $S_r^X[f,k]$ are short-term levels given by:

$$S^E[f,k]=(1-\alpha)S^E[f-1,k]+\alpha|X_r[f,k]-Y[f,k]|,$$

and $$S_r^X[f,k]=(1-\alpha)S_r^X[f-1,k]+\alpha|X_r[f,k]|,$$

where $X_r[f,k]$ is the $k^{th}$ STFT bin of the reference microphone. The BPI reflects the beamformer performance by indicating the amount of noise reduction in the output. Larger BPI values indicate higher noise reduction, and values close to η indicate that the signal is from the desired direction. As will be described below, the illustrated embodiment of the postfilter uses the BPI to improve its discrimination between speech and noise in the STFT bins.

F. AEC Processing

In applications such as videoconferencing where speakerphone functionality is required, an AEC may be employed to cancel echo resulting from acoustic coupling between speaker and microphones. AEC processing is known and will not be described herein. To reduce computational complexity, the illustrated embodiment performs AEC processing after beamforming. The illustrated embodiment further performs AEC processing, if at all, on fewer than all the microphone signals. The illustrated embodiment is capable of performing AEC internally or externally. When AEC processing is performed externally, the beamformer output may be required to be converted to the time domain before AEC processing and then back to the frequency domain after AEC processing. The illustrated embodiment employs STFT for these conversions as required.

III. Postfiltering

As mentioned in the Background above, postfiltering is employed to reduce residual noise components. Most conventional multi-channel postfiltering techniques assume isotropic noise fields. Unfortunately, this assumption is not guaranteed to be valid in the target applications described above. Also, multi-channel postfilters require the estimation of cross-spectral densities, the calculation of which requires twice the numerical range of the STFT bins. For at least these reasons, only single-channel noise reduction methods will be considered herein.

Many single-channel noise reduction methods exist. A reasonably comprehensive treatment can be found in Loizou, supra, incorporated herein by reference. Among the various single-channel noise reduction methods, the log-spectral minimum mean squared error (log-MMSE) amplitude estimator is shown to give consistent results in both subjective speech quality and intelligibility tests. For this reason, the illustrated embodiment of the microphone array processing method employs the log-MMSE method as a starting point for the postfiltering that it performs.

Figure 4:
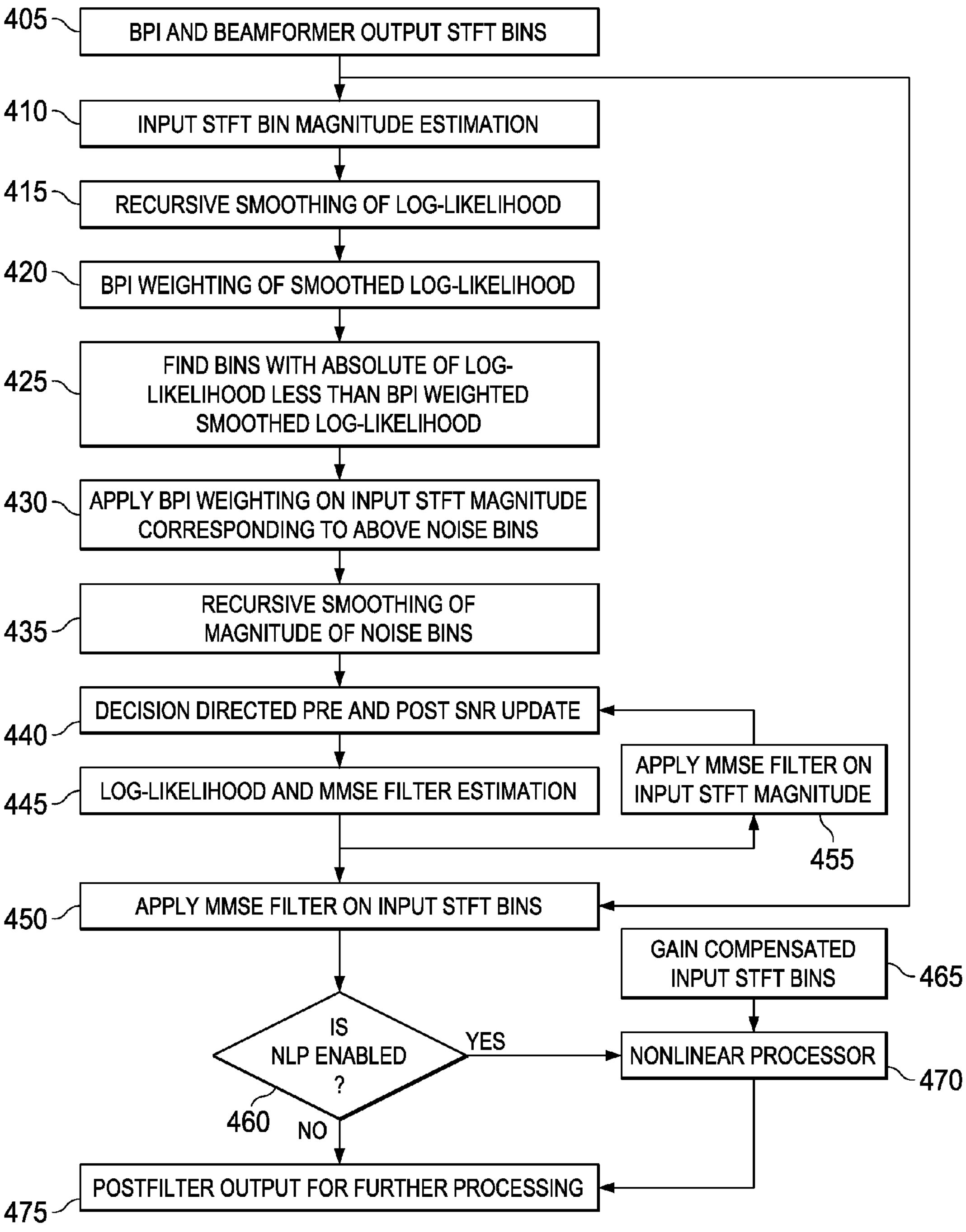
FIG. 4 is a flow diagram of one embodiment of a method of postfiltering carried out in the method of FIG. 2.

Conventional single-channel noise reduction methods, including the log-MMSE method, rely on a knowledge of the background noise spectrum. Hence the first step is to obtain the background noise spectrum through a suitable method. Many conventional noise estimation methods exist, and a reasonably comprehensive treatment is available in Loizou, supra. However, a novel noise estimation method is introduced herein to (a) reduce the burden on memory and clock speed and (b) be able to use information gained during beamforming. The novel method is based on the tracking of log-likelihood speech presence indicators weighted by information derived from the beamformer. For this reason, the novel method will hereinafter be called "BPIW-LLT noise estimation." FIG. 4 is a flow diagram of one embodiment of a method of postfiltering with BPIW-LLT noise estimation and NLP. FIG. 4 represents further detail regarding the step 250 of FIG. 2.

The method begins in a step 405 with STFT bins from the output of the beamformer (with or without AEC having been performed) and the BPI calculated during beamforming. The magnitude of noise present in the STFT bins is estimated in a step 410. A smoothed (e.g., recursively) log-likelihood is determined for the STFT bins in a step 415. The BPI is then employed to weight the smoothed log-likelihood in a step 420. The STFT bins having a log-likelihood value less than the BPI-weighted, smoothed log likelihood (those determined as noise) are identified in a step 425, BPI-weighted in a step 430 and smoothed (e.g., recursively) in a step 435. Both a priori and a posteriori SNRs are updated using a decision-directed approach in a step 440. The log-likelihood and postfilter are then estimated in a step 445. The postfilter (which is a log-MMSE postfilter in the illustrated embodiment) is applied to the input STFT bins in a step 450 and to the input STFT magnitude in a step 455. The latter is employed in updating the SNRs in the step 440 as FIG. 4 shows. If NLP is enabled (as determined in a decisional step 460), gain-compensated input STFT bins are provided in a step 465 and nonlinearly processed in a step 470. Whether or not NLP is enabled, the output STFT bins of the postfilter are provided in a step 475 for further processing.

A. BPIW-LLT Noise Estimation

Log-likelihood is known to be a good indicator of the presence of speech in speech enhancement applications and is calculated as part of the log-MMSE noise reduction method. In the novel noise estimation method introduced herein, an STFT bin is declared as noise if the log-likelihood in that bin is below a threshold. Only the bins that are declared as noise are updated. This combination of using log-likelihood and updating only the STFT bins that are declared as noise reduces computational complexity and therefore allows clock speeds to be reduced.

The determination of whether a STFT bin is noise or speech depends on the level at which the threshold is set. In view of the nature of target applications and the relatively wide dynamic range of speech and the microphone signals, a fixed threshold may result in misdetection and a loss of speech quality. Therefore, a novel method of determining the threshold automatically in real time and tracking the log-likelihood will be introduced herein. The novel method is based at least in part on the observation that since speech is likely to persist after its onset for some time, the mean level of the log-likelihood can indicate the persistence and can be used to determine a suitable threshold.

As described above, the BPI can also provide some indication of whether a particular STFT bin represents speech or noise. It is further realized therefore that a threshold for reliable detection of noise can be determined by combining the BPI $\phi[f,k]$ with the mean log-likelihood level. If $\mu[f,k]$ represents the log-likelihood in $k^{th}$ bin, a STFT bin is declared as noise if:

$$|\mu[f,k]|<\phi[f,k]S^{u}[f,k], \quad (21)$$

where $S^{u}[f,k]$ is the short-term mean level of $\mu[f,k]$ obtained through (e.g., recursive) smoothing as:

$$S^{u}[f,k]=(1-\alpha)S^{u}[f-1,k]+\alpha|\mu[f,k]|. \quad (22)$$

If a STFT bin is declared as containing noise, the noise magnitude $N[f,k]$ in the $k^{th}$ bin is updated using (e.g., recursive) smoothing as:

$$N[f,k]=(1-\alpha)N[f-1,k]+\alpha\phi[f,k]|Y[f,k]| \quad (23)$$

In the illustrated embodiment, the noise magnitude is updated only for the STFT bins that are declared as noise and also that it is weighted by the BPI $\phi[f,k]$. It is realized herein that the BPI weighting in the noise magnitude updating improves the MMSE filter resulting from the log-MMSE method. Also, the parameter $\eta$ in the BPI definition of Equation (20) can be used to control the level of the noise magnitude and thus the amount of noise reduction achievable in the postfilter output. Hence the BPI can be quite useful to that end and therefore plays an important role in certain embodiments of the methods introduced herein.

Once noise magnitude is estimated, the illustrated embodiment of the microphone array processing method employs a decision-directed approach (see, e.g., Loizou, supra; and Ephraim, et al., "Speech Enhancement Using a Minimum Mean-Square Error Short-Time Spectral Amplitude Estimator," IEEE Trans. on Acoustics, Speech and Signal Proc., pp. 1109-1121, December 1984) to obtain the MMSE filter $H[f,k]$. In Ephraim, et al., supra, the decision-directed approach calculates both a priori and a posteriori SNRs as ratios of Power Spectral Densities (PSDs). To avoid using twice the numerical range that a PSD would need, the illustrated embodiment only calculates and updates the input and noise magnitude. Since the magnitude is equivalent to the square root of the PSD, a lower numerical range can be accommodated. The SNRs are then calculated as ratios of magnitudes and squared since the range of SNR values is small. The output of MMSE filter is then obtained as:

$$Z[f,k]=H[f,k]Y[f,k]. \quad (24)$$

The MMSE filter is also applied on the input magnitude and provided as feedback for the decision-directed SNR updating of the step 440 as FIG. 4 shows.

B. NLP

In many situations, some low-level residual noise may still remain after post-filtering. To reduce the residual noise, NLP is employed on the output of the postfilter in the illustrated embodiment. When enabled, NLP can further suppress the residual noise or replace it with Comfort Noise (CN). The illustrated embodiment of the method first detects if the residual noise in an STFT bin is lower than a threshold. Based on the decision, a counter is incremented. When the counter reaches a certain value, the residual noise is suppressed or replace. The counter is used to guard against NLP cutting in and out frequently and adversely affecting speech quality.

If $\tau[f,k]$ represents a counter for the $k^{th}$ bin and $\tau_{min}$ and $\tau_{max}$ are the minimum and maximum values that the counter can assume, the counter for each STFT bin is updated as:

$$\tau[f,k]=\begin{cases}\tau[f-1,k]+1 & \text{if } L^{Z}[f,k]\le\varphi[k]L_{r}^{X}[f,k]\\ \tau[f-1,k]-1 & \text{if } L^{Z}[f,k]>\varphi[k]L_{r}^{X}[f,k],\end{cases}$$

where $\phi[k]$ is the threshold, $L_r^X[f,k]$ is the long-term level of the input STFT bin corresponding to the reference microphone and $L^Z[f,k]$ is the long-term level of the STFT bin of the post-filter output. $L_r^X[f,k]$ and $L^Z[f,k]$ are obtained by recursive averaging as:

$$L_r^X[f,k]=(1-\beta)L_r^X[f-1,k]+\beta|X_r[f,k]|$$

and $$L^Z[f,k]=(1-\beta)L^Z[f-1,k]+\beta|Z_r[f,k]|.$$

After updating, the counter is checked to ensure that it is within limits, viz.: $\tau_{max}\le\tau[f,k]\le\tau_{max}$. The threshold $\phi[k]$ is chosen to be between 15-18 dB, since the minimum noise reduction expected from the combination of beamforming and postfiltering is about 15 dB. An STFT bin is said to contain residual noise whenever $\tau[f,k]=\tau_{max}$ calling for an attenuation to be applied on the postfilter output $Z[f,k]$:

$$Z^{NLP}[f,k]=\delta[f,k]Z[f,k], \quad (25)$$

where $\delta[f,k]$ is an attenuation factor. For hard-limiting NLP, $\delta[f,k]$ is constant across all frames and bins. For softlimiting NLP, which the illustrated embodiment employs, the attenuation factor is defined as:

$$\delta[f,k] = \frac{L^Z[f,k]}{L_r^X[f,k]}. \quad (26)$$

If NLP is disabled, Z[f,k] is given as the output of the postfilter. If NLP is enabled and comfort noise generation is disabled, $Z^{NLP}[f,k]$ is given as the output of the postfilter. If both NLP and comfort noise generation are enabled, appropriate comfort noise is generated and given as the output of the postfilter. The postfilter output is then further processed as shown in FIG. 2.

IV. Output Processing

The output processing stage primarily consists of standard inverse STFT operation. First, 2N complex STFT bins are generated from K processed STFT bins using symmetry property. Then the signal is converted back to the time domain using STFT. Finally a WOLA synthesis window is applied, and a frame of output is generated.

Those skilled in the art to which this application relates will appreciate that other and further additions, deletions, substitutions and modifications may be made to the described embodiments.

What is claimed is:

1. A microphone array processing system, comprising:

a beamformer configured to perform adaptive beamforming on gain-compensated signals received from a plurality of microphones, said adaptive beamforming including dynamic range compression and diagonal loading of a sample correlation matrix based on order statistics; and a postfilter configured to receive an output of said beamformer and reduce noise components remaining from said beamforming.

2. The system as recited in claim 1 wherein said system employs self-calibration to generate said gain-compensated signals.

3. The system as recited in claim 1 wherein said dynamic range compression is fixed point dynamic range compression.

4. The system as recited in claim 1 wherein said adaptive beamforming further includes estimating said sample correlation matrix.

5. The system as recited in claim 1 wherein said beamformer is further configured to perform fixed beamforming or said adaptive beamforming based on a decision.

6. The system as recited in claim 1 wherein said beamformer is further configured to perform recursive smoothing of beamformer weights.

7. The system as recited in claim 1 wherein said beamformer is configured to perform said adaptive beamforming on said gain-compensated signals after said signals have been transformed into a frequency domain.

8. The system as recited in claim 1 further comprising an acoustic echo canceller configured to receive said output of said beamformer and provide an acoustic echo canceller output to said postfilter.

9. A microphone array processing system, comprising:

a beamformer configured to perform beamforming on gain-compensated signals received from a plurality of microphones and generate an index indicating a noise reduction performance of said beamformer; and a postfilter configured to receive an output of said beamformer and employ a log likelihood tracking technique, weighted by said index, to estimate noise remaining from said beamforming.

10. The system as recited in claim 9 wherein said system employs self-calibration to generate said gain-compensated signals.

11. The system as recited in claim 9 wherein said index is a beamformer performance index.

12. The system as recited in claim 9 wherein said postfilter is a log-spectral minimum mean squared error postfilter.

13. The system as recited in claim 9 wherein said postfilter is further configured to perform nonlinear processing.

14. The system as recited in claim 9 wherein said output of said postfilter is transformed into a time domain.

15. The system as recited in claim 9 further comprising an acoustic echo canceller configured to receive said output of said beamformer and provide an acoustic echo canceller output to said postfilter.

16. A microphone array processing system, comprising:

a beamformer configured to perform adaptive beamforming on gain-compensated signals received from a plurality of microphones and transformed into a frequency domain and generate an index indicating a noise reduction performance of said beamformer, said adaptive beamforming including dynamic range compression and diagonal loading of a sample correlation matrix based on order statistics; and a postfilter configured to receive an output of said beamformer and employ a log likelihood tracking technique, weighted by said index, to estimate noise remaining from said beamforming.

17. The system as recited in claim 16 wherein said system employs self-calibration to generate said gain-compensated signals.

18. The system as recited in claim 16 wherein said dynamic range compression is fixed point dynamic range compression.

19. The system as recited in claim 16 further comprising an acoustic echo canceller configured to receive said output of said beamformer and provide an acoustic echo canceller output to said postfilter.

20. The system as recited in claim 16 wherein said index is a beamformer performance index.

21. The system as recited in claim 16 wherein said postfilter is a log-spectral minimum mean squared error postfilter.

22. The system as recited in claim 16 wherein said postfilter is further configured to perform nonlinear processing.

* * * * *